US 9,179,273 B2

(12) United States Patent
Jeong et al.

(10) Patent No.: US 9,179,273 B2
(45) Date of Patent: Nov. 3, 2015

(54) APPARATUS AND METHOD FOR DELIVERING SHORT MESSAGE SERVICE EFFICIENTLY IN WIRELESS COMMUNICATION SYSTEM

(71) Applicant: Samsung Electronics Co. Ltd., Suwon-si, Gyeonggi-do (KR)

(72) Inventors: Sangsoo Jeong, Suwon-si (KR); Hanna Lim, Seoul (KR); Songyean Cho, Seoul (KR); Sangbum Kim, Suwon-si (KR); Soenghun Kim, Yongin-si (KR); Jaehyuk Jang, Suwon-si (KR); Kyeongin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/706,935

(22) Filed: Dec. 6, 2012

(65) Prior Publication Data

US 2013/0143610 A1   Jun. 6, 2013

Related U.S. Application Data

(60) Provisional application No. 61/567,323, filed on Dec. 6, 2011, provisional application No. 61/595,646, filed on Feb. 6, 2012.

(30) Foreign Application Priority Data

Dec. 5, 2012  (KR) .......................... 10-2012-0140229

(51) Int. Cl.
*H04W 4/00* (2009.01)
*H04W 4/14* (2009.01)
(Continued)

(52) U.S. Cl.
CPC . *H04W 4/14* (2013.01); *H04W 8/18* (2013.01); *H04W 60/00* (2013.01)

(58) Field of Classification Search
CPC ........... H04W 4/02; H04W 4/12; H04W 4/14; H04W 4/16; H04W 4/18; H04W 36/12; H04W 36/14; H04W 36/16; H04W 36/24; H04W 36/34; H04W 68/00; H04W 84/02; H04W 84/06; H04W 88/12; H04W 8/00; H04W 60/00; H04W 88/16; H04W 88/18; H04W 60/005; H04W 8/18; H04L 12/582; H04L 12/583; H04L 12/5865; H04L 12/594; H04L 29/00; H04L 12/5895; H04L 51/066; H04L 51/38; H04J 11/0023
USPC ............ 455/466, 432.3, 433, 433.1, 435.1–6, 455/452.1, 456, 709, 455; 370/230, 242, 370/328, 329, 310, 331

See application file for complete search history.

(56) References Cited

U.S. PATENT DOCUMENTS

| 8,676,156 | B1 * | 3/2014 | Oroskar et al. ............... 455/406 |
| 2005/0002407 | A1 * | 1/2005 | Shaheen et al. ............... 370/401 |

(Continued)

FOREIGN PATENT DOCUMENTS

WO   2012/136374 A2   10/2012

OTHER PUBLICATIONS

3GPP LTE—A Global Initiative, ETSI TS 123 172, V10.5.0, Digital Cellular Telecommunications System (Phase 2+); Universal Mobile Telecommunications System (UMTS); LTE; Circuit Switched (CS) fallback in Evolved Packet System (EPS); Stage 2, XP014068097, Oct. 1, 2011.

(Continued)

*Primary Examiner* — Mahendra Patel
(74) *Attorney, Agent, or Firm* — Jefferson IP Law, LLP

(57) ABSTRACT

A Short Message Service (SMS) delivery method and apparatus is provided for delivering an SMS message efficiently by selecting a network domain to attach to according to the service provided to a Mobile Station (MS) by the mobile operator network. An SMS delivery method of the present invention includes receiving, at a network node, an Attach/Routing Area Update (RAU) Request message including a parameter indicating an attach/update type and SMS-only service, and transmitting, when SMS in a Serving General Packet Radio Service (GPRS) Support Node (SGSN) is supported at the core network node, to the mobile station an Attach Accept message including a parameter indicating that SMS in SGSN is supported. The SMS delivery method of the present invention is capable of delivering SMS message efficiently in the wireless communication system.

18 Claims, 7 Drawing Sheets

(51) Int. Cl.
*H04W 60/00* (2009.01)
*H04W 8/18* (2009.01)

(56) References Cited

U.S. PATENT DOCUMENTS

| | | | |
|---|---|---|---|
| 2006/0063486 A1* | 3/2006 | McClendon | 455/15 |
| 2007/0019643 A1 | 1/2007 | Shaheen | |
| 2007/0032251 A1 | 2/2007 | Shaheen | |
| 2007/0223428 A1* | 9/2007 | Patterson et al. | 370/338 |
| 2009/0221310 A1* | 9/2009 | Chen et al. | 455/466 |
| 2010/0144351 A1* | 6/2010 | Witzel et al. | 455/435.2 |
| 2010/0261490 A1* | 10/2010 | Berry et al. | 455/466 |
| 2011/0085535 A1 | 4/2011 | Shaheen | |
| 2011/0188416 A1 | 8/2011 | Faccin et al. | |
| 2011/0194505 A1 | 8/2011 | Faccin et al. | |
| 2012/0203909 A1* | 8/2012 | Kavanaugh et al. | 709/226 |
| 2012/0246325 A1* | 9/2012 | Pancorbo Marcos et al. | 709/227 |
| 2013/0053031 A1* | 2/2013 | Widjaja et al. | 455/435.1 |
| 2014/0007200 A1* | 1/2014 | Zisimopoulos et al. | 726/4 |

OTHER PUBLICATIONS

3GPP TSG SA WG2 Meeting #89, TD S2-110485, PS-only High Level Function Description, XP050576361, Jan. 31, 2012, Vancouver, CA.

3GPP TR 23.888, 3rd Generation Partnership Project; Technical Specification Group Services and System Aspects; System Improvements for Machine-Type Communications (Release 11), XP050575133, Dec. 2, 2011.

3GPP TSG SA WG2 Meeting #88, TD S2-115461, Discussions and Conclusions about PS-only, XP050575835, San Francisco, CA, Nov. 19, 2011.

\* cited by examiner

APPARATUS AND METHOD FOR DELIVERING SHORT MESSAGE SERVICE EFFICIENTLY IN WIRELESS COMMUNICATION SYSTEM

CROSS-REFERENCE TO RELATED APPLICATIONS

This application claims the benefit under 35 U.S.C. §119(e) of U.S. Provisional applications filed on Dec. 6, 2011 in the U.S. Patent and Trademark Office and assigned Ser. No. 61/567,323 and Feb. 6, 2012 in the U.S. Patent and Trademark Office and assigned Ser. No. 61/595,646, and under 35 U.S.C. §119(a) of a Korean patent application filed on Dec. 5, 2012 in the Korean Intellectual Property Office and assigned Serial No. 10-2012-0140229, the entire disclosure of each of which is hereby incorporated by reference.

BACKGROUND OF THE INVENTION

1. Field of the Invention

The present invention relates to a Short Message Service (SMS) delivery control method and apparatus. More particularly, the present invention relates to an SMS delivery method and apparatus for efficiently delivering an SMS message.

2. Description of the Related Art

Typically, SMS is provided with the assistance of a Mobile Switching Center (MSC) in a Circuit-Switched (CS) domain. In this respect, network operators adopted Long Term Evolution (LTE) for providing smartphone users with data-centric services. However, because the service providers also provide voice call services over the LTE network (i.e. Voice over IP (VoIP)) rather than a CS network, it can be a significant burden to maintain and manage CS network nodes such as a Visitor Location Register (VLR)/MSC only for providing the SMS service. Accordingly, mobile communication operators are studying the function of providing subscribers with SMS over a Packet Switched (PS) network without the MSC, i.e., CS infrastructure.

In the case of terminals processing only PS data, with the exception of voice, such as a Machine to Machine (M2M) device and a dongle, as well as terminals supporting both voice and data communications, there can be a situation requiring the use of SMS (e.g., when an Open Mobile Alliance Device Management (OMA-DM) service provider configures the terminal). This means that there are newly emerging types of terminals requiring use of PS service and SMS, but not requiring the use of CS service.

In order to provide the user, that does not have a CS-capable device, with SMS through the PS domain, a Serving General Packet Radio Service (GPRS) Support Node (SGSN) has to be configured to deliver the SMS to a Mobile Station (MS). Whether to enable such a function is an option selectable by the mobile communication operator. The SMS delivery capability may not be implemented by the mobile communication operator or, although the SGSN has the SMS delivery capability, it can be disabled by the mobile communication operator.

In the case in which the mobile communication operator network supports the SMS delivery over PS domain, there is no problem if the MS having the PS and SMS-only capability attaches to the PS domain to receive the corresponding service. However, if the mobile communication operator network does not support the SMS delivery over the PS domain, the MS having the PS and SMS-only capability has to attach to the CS domain in order to use the SMS.

As described above, the mobile communication system of the related art has a drawback in that the network domain (PS, CS, or PS and CS) for serving the MS must be changed depending on the mobile communication network configuration (i.e., whether the core network node supports SMS delivery capability and whether the mobile communication network operator enables the SMS delivery capability over the PS network) and the type of service which the MS wants to access.

Accordingly, there is a need for an apparatus and method for delivering an SMS message or small data efficiently in such a way that the MS determines the network domain to attach to according to the service served by the mobile communication operator network.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method and apparatus for delivering a Short Message Service (SMS) message or small data efficiently in such a way that the Mobile Station (MS) determines the network domain to attach to according to the service served by the mobile communication operator network.

In accordance with an aspect of the present invention, an SMS delivery method of a core network node in a wireless communication system is provided. The method includes receiving an Attach/Routing Area Update (RAU) Request message including a parameter indicating an attach/update type and SMS-only service, and transmitting, when SMS in SGSN is supported at the core network node, to the mobile station an Attach Accept message including a parameter indicating that SMS in SGSN is supported.

In accordance with another aspect of the present invention, an SMS delivery method of a mobile station in a wireless communication system is provided. The method includes transmitting an Attach/RAU Request message including a parameter indicating an attach type and SMS-only service, and receiving an Attach Accept message from a core network node, the Attach Accept message including a parameter indicating that SMS in SGSN is supported at the core network node.

In accordance with another aspect of the present invention, a core network node for delivering SMS in a wireless communication system is provided. The core network node includes a control unit for receiving an Attach/RAU Request message including a parameter indicating an attach/update type and SMS-only service and for transmitting, when SMS in SGSN is supported at the core network node, to the mobile station an Attach/RAU Accept message including a parameter indicating that SMS in SGSN supported.

In accordance with still another aspect of the present invention, a mobile station for receiving SMS in a wireless communication system is provided. The mobile station includes a control unit for transmitting an Attach/RAU Request message including a parameter indicating an attach type and SMS-only service and for receiving an Attach Accept message from a core network node, the Attach Accept message including a parameter indicating that SMS in SGSN is supported at the core network node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
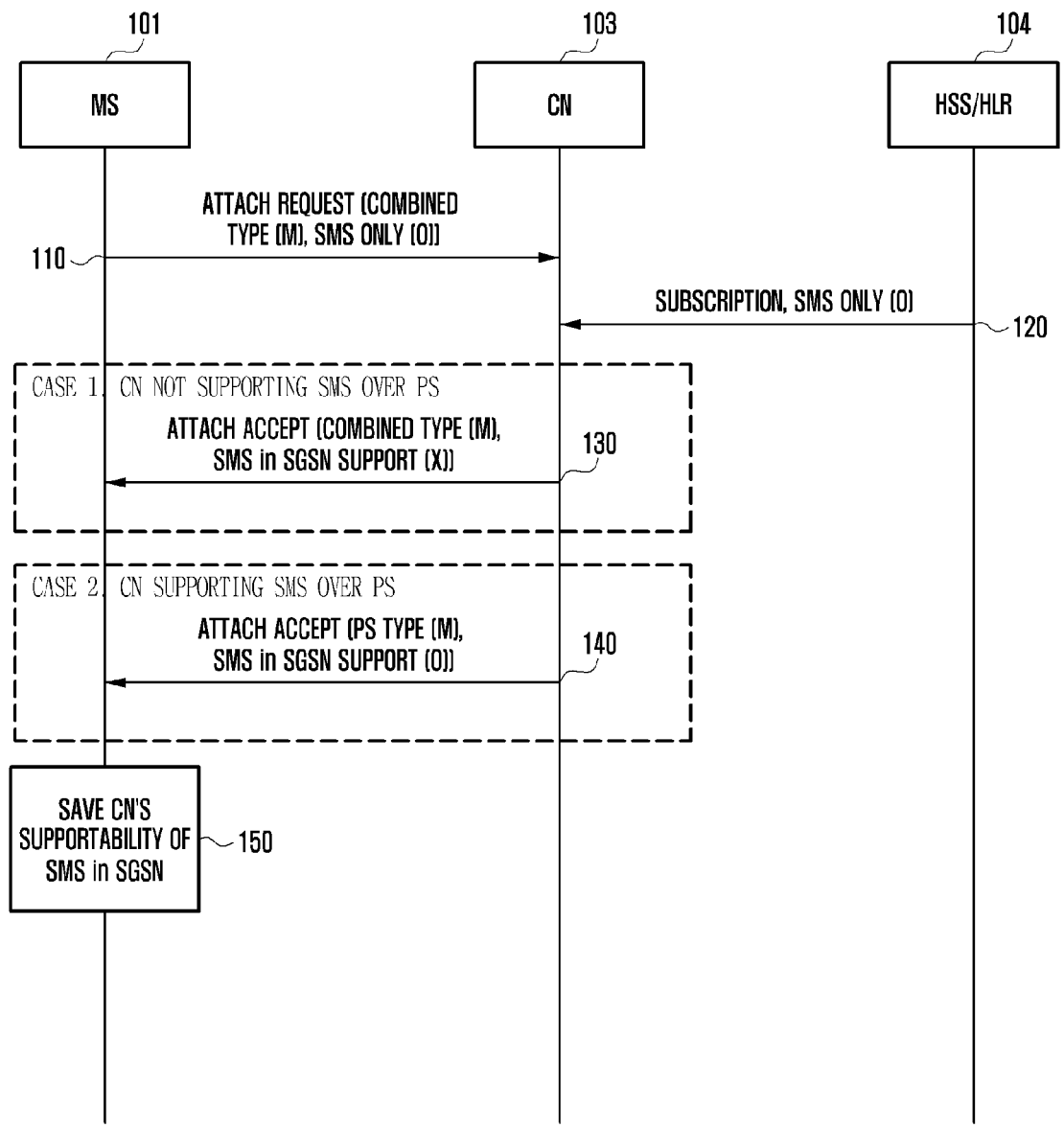
FIG. 1 is a signal flow diagram illustrating a domain selection procedure for a Mobile Station (MS) attempting combined Packet Switched/Circuit Switched (PS/CS) attach in a Short Message Service (SMS) delivery method according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the exemplary embodiments of the present invention are directed to the $3^{rd}$ Generation Partnership Project (3GPP) Long Term Evolution (LTE) system, it is obvious to those skilled in the art that the present invention is applicable to other communication/computer systems having a similar technical background and system configurations with slight modification without departing from the scope of the present invention. For example, the present invention can be applied to systems configured with the terminals having the communication function similar to that of a User Equipment (UE), a network node equipped with the Packet Switched (PS) data transmission control function similar to that of Mobility Management Entity (MME), a network node equipped with the Circuit Switched (CS) data transmission control function similar to that of Mobile Switching Center (MSC), and a database node with subscriber information and location information storage function similar to that of Home Subscriber Server/Home Location Register (HSS/HLR).

Further, although exemplary embodiments of the present invention are directed to the Short Message System (SMS), it is obvious to those skilled in the art that the present invention is applicable to other small data. Additionally, it is obvious to those skilled in the art that an operation related to an initial attach in the exemplary embodiments of the present invention is applicable to the Routing Area Update (RAU). Moreover, although the SMS delivery over PS (SMS over PS) is directed to SMS in Serving General Packet Radio Service (GPRS) Support Node (SGSN), in the exemplary embodiments of the present invention, it is obvious to those skilled in the art that the present invention is applicable to any other entity rather than SGSN that can deliver SMS over PS.

<First Exemplary Embodiment>

According to the first exemplary embodiment, the domain to attach to is selected through the interaction between a Mobile Station (MS) and a Core Network (CN) node.

If the MS sends an Attach Request message, the CN node selects the domain to which the MS is to attach depending on the MS's attach type, whether the MS has the SMS-only capability, and whether the operator network supports SMS over PS (i.e., SMS in SGSN). The Attach Request message includes information on the type of the domain to attach to and an SMS service request, and the CN node is capable of requesting the HSS/HLR for the MS information to determine whether the MS uses PS and additionally SMS services.

MS Attempting Combined PS/CS Attach

FIG. 1 is a signal flow diagram illustrating a domain selection procedure for an MS attempting combined PS/CS attach/RAU in an SMS delivery method according to an exemplary embodiment of the present invention.

Referring to FIG. 1, the MS 101 sends the Attach/RAU Request message to the CN node 103 (i.e. SGSN) at step 110. At this time, the MS 101 is capable of requesting the combined PS/CS attach/RAU and SMS-only service with the exception of voice call service. The MS 101 is also capable of notifying the CN node 103 of the intended service by transmitting the Attach/RAU Request message including an attach type parameter or indicator set to PS/CS combined and a service type parameter or indicator set to SMS-only.

If the Attach/RAU Request message is received, the CN node 103 exchanges information with the HSS/HLR 104. The CN node 103 transmits a message (i.e. an Update Location message) that includes information indicating that CN node 103 supports SMS in SGSN. The HSS/HLR 104 can provide information indicating whether the MS 101 supports PS service and SMS-only service with or in the subscription information in step 120. That is, the CN node 103 receives the information of the MS properties from the HSS/HLR 104.

The CN node 103 acquires the information indicating that the MS 101 requests a combined PS/CS attach and SMS-only service from the Attach Request message, receives the information that the MS 101 supports PS service and SMS-only service from the HSS/HLR 104, and determines whether the information matches.

Once it is determined that the MS 101 supports PS service and SMS-only service, the CN node 103 sends the MS 101 the information which is determined depending on whether it supports SMS in SGSN. Further, the CN node 103 determines whether to perform additional location update of CS network (e.g., a Mobile Switching Center (MSC) or a Visitor Location Register (VLR)), according to whether the SMS in SGSN is supported at the CN node 103.

In the case of not supporting SMS in SGSN, the CN node 103 sends the MS 101 the Attach Accept message along with or including the information indicating that the CN node 103 does not support the SMS in SGSN at step 130. Next, the MS 101 saves the information on whether the CN node 103 supports SMS in SGSN at step 150.

In the case of supporting SMS in SGSN, this means that the MS 101 does not need to attach to the CS network and thus the CN node 103 sends the MS 101 the Attach Accept message for accepting only the GPRS attach at step 140. In this case, the CN node 103 is capable of transmitting the information indicating that the SMS in SGSN is supported along with or in the Attach Accept message. Afterward, the MS 101 saves the information on whether the CN node 103 supports SMS in SGSN at step 150.

The MS 101 stores the supportability of SMS in SGSN per Public Land Mobile Network (PLMN) or Location Area for use in interaction with the core network when the PLMN or Location Area is changed afterward.

An MS that needs PS service and SMS-only service may not perform any procedure through the CS network, when the MS receives information indicating that SMS in SGSN is supported.

According to an exemplary embodiment of the present invention, when the MS is attempting to attach to the PS and CS services simultaneously, the CN node verifies the MS's request based on the MS information provided by HSS/HLR and sends the MS the information configured depending on whether the CN node supports SMS in SGSN such that the MS determines the domain to attach to based on the information.

MS Attempting to Attach to PS Domain

Figure 2:
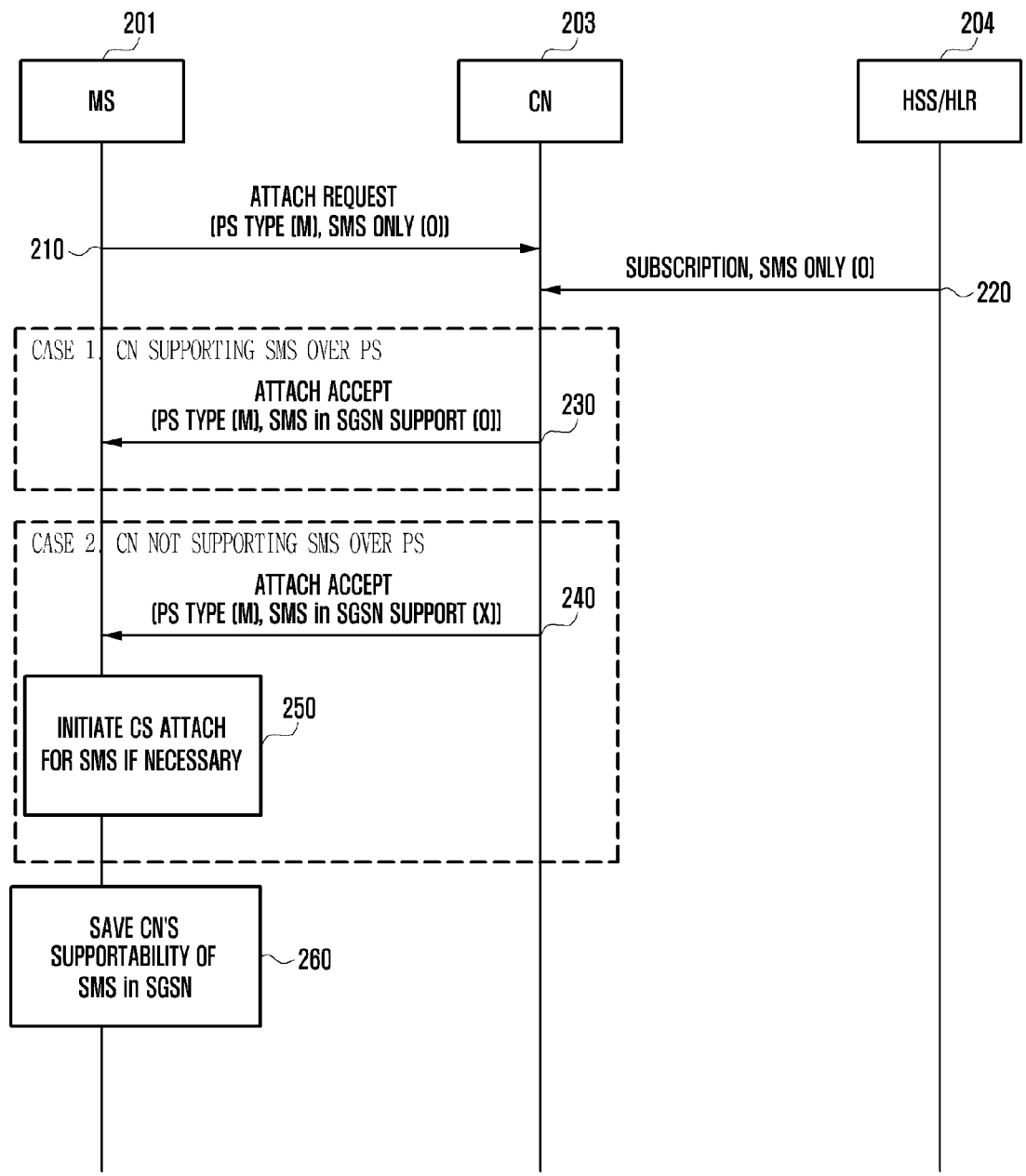
FIG. 2 is a signal flow diagram illustrating a domain selection procedure for an MS attempting to attach to a PS domain in an SMS delivery method according to an exemplary embodiment of the present invention.

FIG. 2 is a signal flow diagram illustrating a domain selection procedure for an MS attempting to attach to a PS domain in an SMS delivery method according to an exemplary embodiment of the present invention.

Referring to FIG. 2, the MS 201 sends the Attach/RAU Request message to the CN node 203 at step 210. At this time, the MS 201 is capable of requesting for PS attach with SMS-only capability without voice call service. The MS 201 is also capable of notifying the CN node 203 of the intended service by transmitting the Attach/RAU Request message including an attach type parameter or indicator set to PS and a service type parameter or indicator set to SMS-only.

If the Attach/RAU Request message is received, the CN node 203 exchanges information with the HSS/HLR 204. The CN node 203 transmits a message (i.e. an Update Location message) that includes information indicating that the CN node 203 supports SMS in SGSN. The HSS/HLR 204 can provide information indicating whether the MS 201 supports PS service and SMS-only service with or in the subscription information in step 220. That is, the CN node 203 receives the information of the MS properties from the HSS/HLR 204.

The CN node 203 acquires the information indicating that the MS 201 requests PS attachment and SMS-only service in the Attach Request message, receives the information that the MS 201 supports PS service and SMS-only service from the HSS/HLR 204, and determines whether the information matches.

Once it is determined that the MS 201 supports PS service and SMS-only service, the CN node 203 sends the MS 201 the information which is determined depending on whether it supports SMS in SGSN.

In the case of supporting SMS in SGSN, the CN node 203 sends the MS 201 the Attach Accept message at step 230. In this case, the Attach Accept message includes the information that the CN node 203 supports the SMS in SGSN. The MS 201 saves the information on whether the CN 203 supports SMS in SGSN at step 260.

In the case of not supporting SMS in SGSN, the CN node 203 sends the Attach Accept message for accepting the PS attachment along with the information that SMS in SGSN is not supported at step 240. The information that SMS in SGSN is not supported can be included in the Attach Accept message. This is to notify the MS 201 that separate CS attachment is necessary to receive the SMS service since the CN node 203 does not support SMS in SGSN. If the Attach Accept message for accepting the PS attachment is received along with the information that the SMS in SGSN is not supported, the MS 201 determines whether to attach to the CS domain for SMS based on the indication from the CN node 203 or the information stored in the MS 201 at step 250. Afterward, the MS 201 saves the information on whether the CN node 203 supports SMS in SGSN at step 260.

The MS 201 stores the supportability of SMS in SGSN per PLMN or Location Area for use in interaction with the core network when the PLMN or Location Area is changed afterward.

According to an exemplary embodiment of the present invention, when the MS is attempting to attach to the PS domain, the CN node verifies the MS's request based on the MS information provided by the HSS/HLR and sends the information configured depending on whether the CS node supports SMS in SGSN such that the MS determines the domain to attach to.

MS Attempting to Attach to CS Domain

Figure 3:
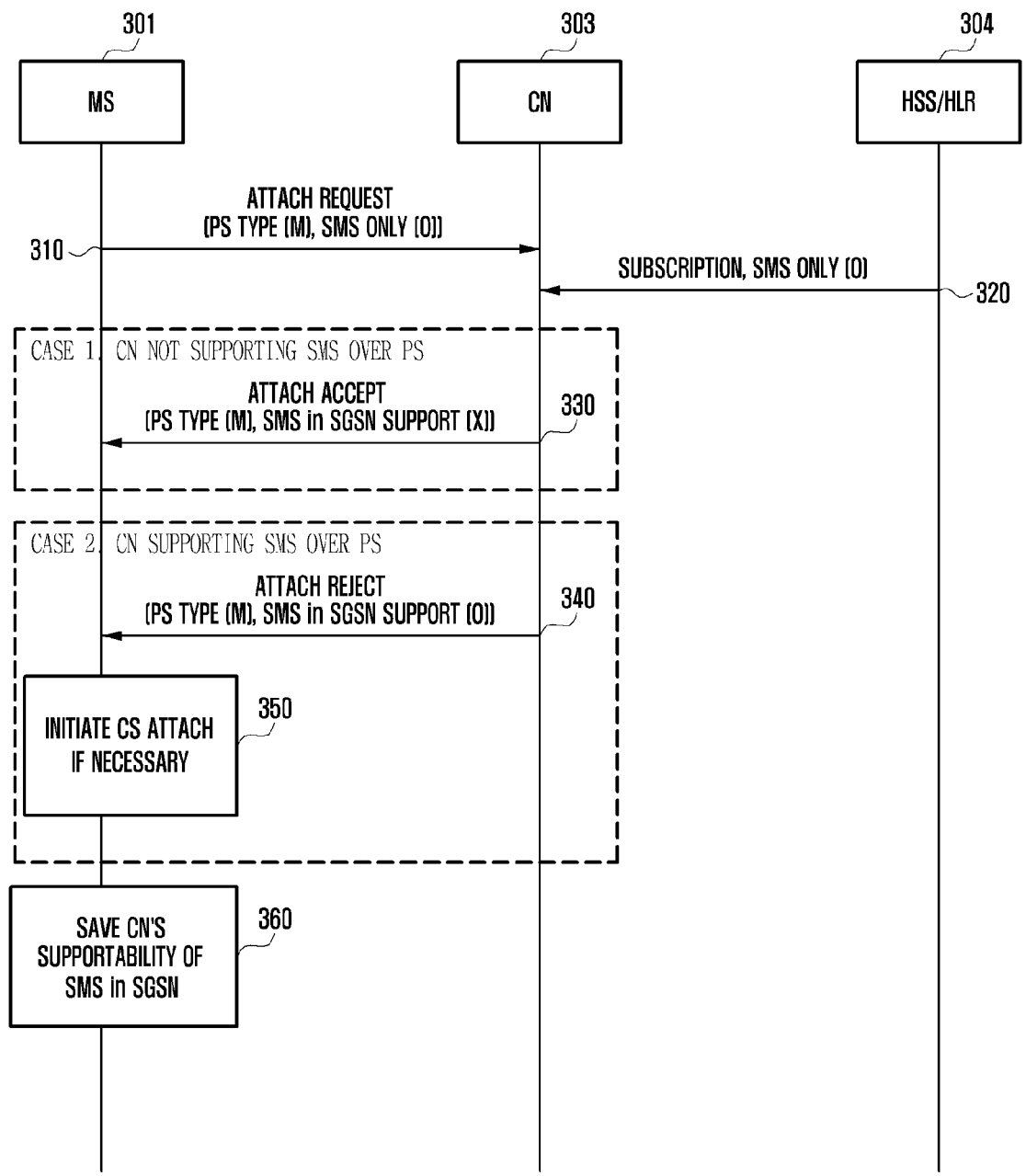
FIG. 3 is a signal flow diagram illustrating a domain selection procedure for an MS attempting to attach to a CS domain in an SMS delivery method according to an exemplary embodiment of the present invention.

FIG. 3 is a signal flow diagram illustrating a domain selection procedure for an MS attempting to attach to a CS domain in an SMS delivery method according to an exemplary embodiment of the present invention.

Referring to FIG. 3, the MS 301 sends the Attach Request message to the CN node 303 at step 310. At this time, the MS 301 is capable of requesting the SMS-only service with the exception of voice call service. The MS 301 is also capable of notifying the CN node 303 of the intended service by transmitting the Attach Request message including an attach type parameter or indicator set to CS and a service type parameter or indicator set to SMS-only.

After receiving the Attach Request message, the CN node 303 exchanges information with the HSS/HLR 304. The CN node 303 transmits a message (i.e. an Update Location message) that includes information indicating that CN node 303 supports SMS in SGSN. The HSS/HLR 304 can provide information indicating whether the MS 301 supports PS service and SMS-only service with or in the subscription information in step 320. That is, the CN node 303 receives the information of the MS properties from the HSS/HLR 304.

The CN node 303 acquires the information indicating that the MS 301 requests PS attachment and SMS-only service in the Attach Request message, receives the information that the MS 301 supports PS service and SMS-only service from the HSS/HLR 304, and determines whether the information matches.

Once it is determined that the MS 301 is PS-only enabled and supports SMS-only service, the CN node 303 sends the MS 301 the information that is determined depending on whether the CN node 303 supports SMS in SGSN. Further, the CN node 303 determines whether to perform additional location update of CS network (MSC or VLR), according to whether the SMS in SGSN is supported at the CN node 303.

In the case of not supporting SMS in SGSN, the CN node 303 sends the MS 301 the Attach Accept message at step 330. In this case, the Attach Accept message includes the information that the CN node 303 does not support SMS in SGSN. The MS 301 saves the information on whether the CN node 303 supports SMS in SGSN at step 360.

In the case of supporting SMS in SGSN, this means that it is not necessary for the MS 301 to attach to the CS network and thus the CN node 303 sends the MS 301 the Attach Reject message to reject attachment to the CS network at step 340. At this time, the CN node 303 is capable of transmitting the information on the supportability of SMS in SGSN separately or in the Attach Reject message. In this case, the MS 301 determines whether to perform the PS attachment for SMS using the indication from the CN node 303 or the saved information at step 350. Next, the MS 301 saves the information on whether the CN node 303 supports SMS in SGSN at step 360.

The MS 301 stores the supportability of SMS in SGSN per PLMN or Location Area for use in interaction with the core network when the PLMN or Location Area is changed afterward.

According to an exemplary embodiment of the present invention, when the MS is attempting to attach to the CS domain, the CN node determines the validity of the MS's request based on the MS information provided by the HSS/HLR and sends the information configured depending on whether the CN node supports SMS in SGSN such that the MS determines the domain to attach to.

CS-Attached MS Attempting to Attach PS Domain

Figure 4:
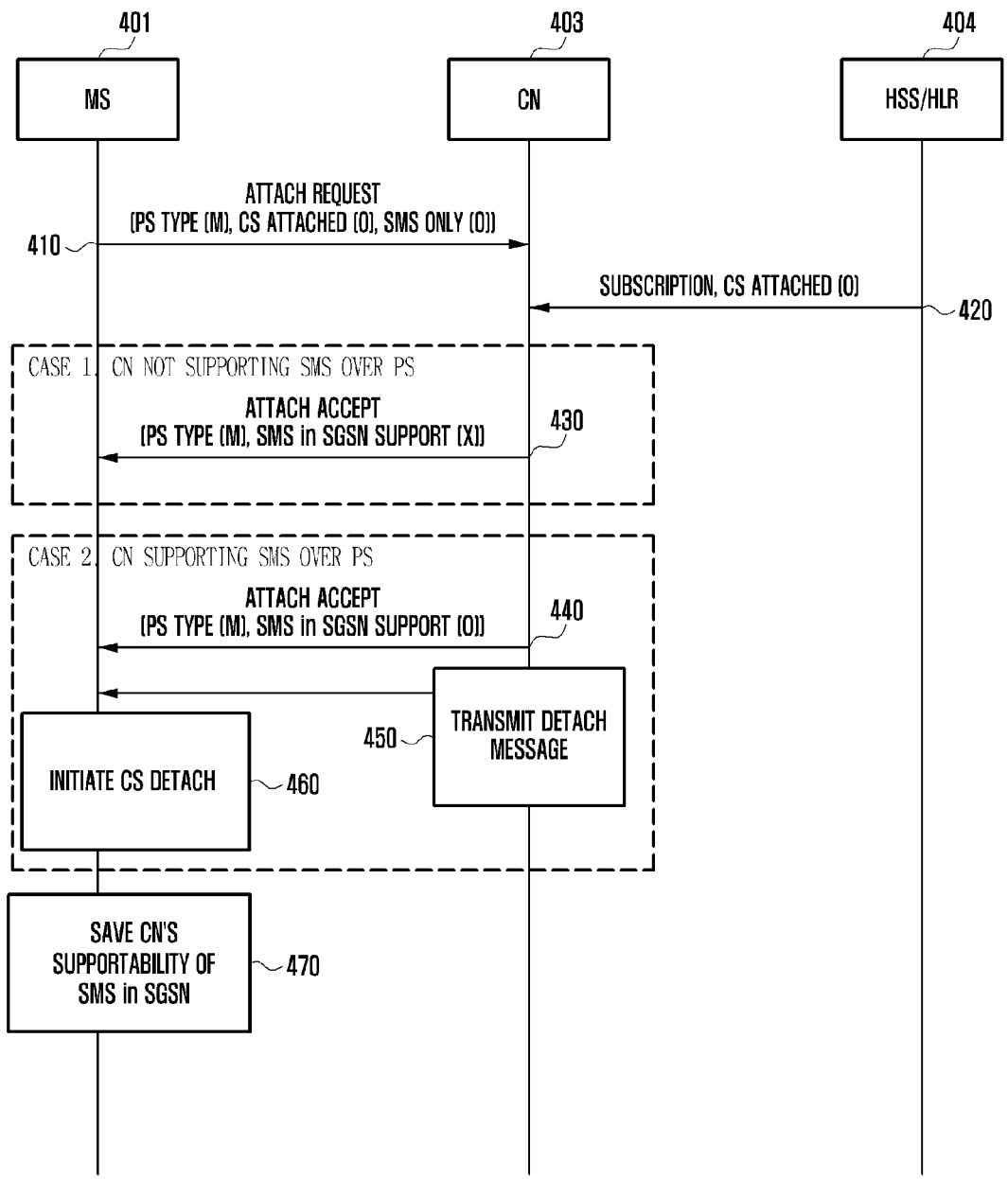
FIG. 4 is a signal flow diagram illustrating a domain selection procedure for a CS-attached MS attempting to attach to a PS domain in an SMS delivery method according to an exemplary embodiment of the present invention.

FIG. 4 is a signal flow diagram illustrating a domain selection procedure for a CS-attached MS attempting to attach to a PS domain in an SMS delivery method according to an exemplary embodiment of the present invention.

Referring to FIG. 4, the MS 401 sends the Attach/RAU Request message to the CN node 403 at step 410. At this time, the MS 401 is capable of requesting the SMS-only service which excludes voice call service. The MS 401 is also capable of notifying the CN node 403 of the intended service by transmitting the Attach/RAU Request message including an attach type parameter or indicator set to PS and a service type parameter or indicator set to SMS-only. The MS 401 is also capable of notifying that it is in the CS-attached state.

If the Attach/RAU Request message is received, the CN node 403 exchanges information with the HSS/HLR 404. The CN node 403 transmits a message (i.e. an Update Location message) that includes information indicating that the CN node 403 supports SMS in SGSN. The HSS/HLR 404 can provide information indicating whether the MS 401 supports PS service and SMS-only service with or in the subscription information in step 420. That is, the CN node 403 receives the information of the MS properties from the HSS/HLR 404.

The CN node 403 acquires the information indicating that the MS 401 requests PS attachment with SMS-only service and is in the CS-attached state from the Attach Request message, receives the information that the MS 401 supports PS service and SMS-only service from the HSS/HLR 404, and determines whether the information matches.

Once it is determined that the MS 401 supports PS service and SMS-only service and is currently attached to the CS network, the CN node 403 sends the MS 401 the information that is determined depending on whether it supports SMS in SGSN. Further, the CN node 403 determines whether to perform additional location update of CS network (MSC or VLR), according to whether the SMS in SGSN is supported at the CN node 403.

In the case of not supporting SMS in SGSN, the CN node 403 sends the MS 401 the Attach Accept message along with or including the information indicating that the CN node 403 does not support the SMS in SGSN at step 430. If the information indicating that the SMS in SGSN is not supported is received along with or in the Attach Accept message, the MS 401 saves the information on whether the CN node 403 supports SMS in SGSN at step 470.

In the case of supporting SMS in SGSN, the CN node 403 sends the Attach Accept message for accepting the PS attachment at step 440. In this case, the CN node 403 is capable of transmitting the information indicating that the SMS in SGSN is not supported along with or in the Attach Accept message.

At step 450, the CN node 403 is also capable of sending a Detach Request message to instruct the MS 401 to perform an International Mobile Subscriber Identity (IMSI) detach from the CS network. This is because the PS attachment of the MS 401 negates the necessity of the CS attachment. Although the CN node 403 does not transmit the Detach Request message, the MS 401 is capable of initiating CS detachment upon receipt of the SMS in SGSN in the CS-attached state at step 460. Afterward, the MS 401 saves the information on whether the CN node 403 supports SMS in SGSN at step 470.

The MS 401 stores the supportability of SMS in SGSN per PLMN or Location Area for use in interaction with the core network when the PLMN or Location Area is changed afterward.

According to an exemplary embodiment of the present invention, when the CS-attached MS is attempting to attach to the PS domain, the CN node verifies the MS's request based on the MS information provided by HSS/HLR and sends the information configured depending on whether the CN node supports SMS in SGSN such that the MS determines the domain to attach to.

PS-Attached MS Attempting to Attach CS Domain

Figure 5:
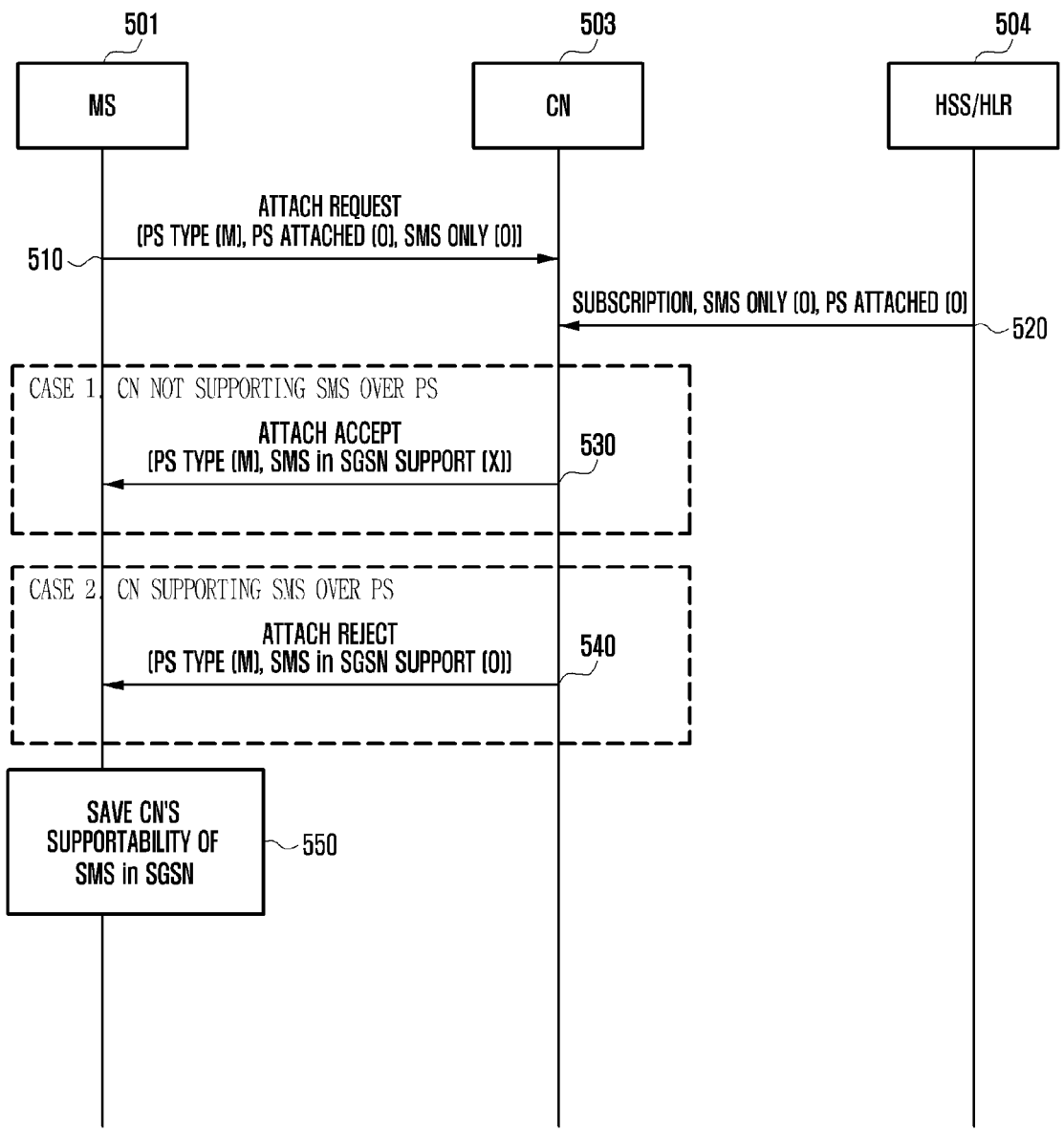
FIG. 5 is a signal flow diagram illustrating a domain selection procedure for a PS-attached MS attempting to attach to a CS domain in an SMS delivery method according to an exemplary embodiment of the present invention.

FIG. 5 is a signal flow diagram illustrating a domain selection procedure for a PS-attached MS attempting to attach to a CS domain in an SMS delivery method according to an exemplary embodiment of the present invention.

Referring to FIG. 5, the MS 501 sends the Attach/RAU Request message to the CN node 503 at step 510. At this time, the MS 501 is capable of requesting the SMS-only service with the exception of voice call service. The MS 501 is also capable of notifying the CN node 503 of the intended service by transmitting the Attach/RAU Request message including an attach type parameter or indicator set to PS and a service type parameter or indicator set to SMS-only. The MS 501 is also capable of notifying that it is in the PS-attached state.

If the Attach/RAU Request message is received, the CN node 503 exchanges information with HSS/HLR 504. The CN node 503 transmits a message (i.e. an Update Location message) that includes information indicating that CN node 503 supports SMS in SGSN. The HSS/HLR 504 can provide information indicating whether the MS 501 supports PS service and SMS-only service with or in the subscription information in step 520. That is, the CN node 503 receives the information of the MS properties from the HSS/HLR 504.

The CN node 503 acquires the information indicating that the MS 501 requests CS attachment and SMS-only service and is in the PS-attached state from the Attach Request message, receives the information that the MS 501 supports PS service and SMS-only service from the HSS/HLR 504, and determines whether the information matches.

Once it is determined that the MS 501 supports PS service and SMS-only service, the CN node 503 sends the MS 501 the information that is determined depending on whether it supports SMS in SGSN. Further, the CN node 503 determines whether to perform additional location update of CS network (MSC or VLR), according to whether the SMS in SGSN is supported at the CN node 503.

In the case of not supporting SMS in SGSN, the CN node 503 sends the MS 501 the Attach Accept message along with or including the information indicating that the CN node 503 does not support the SMS in SGSN at step 530. If the information indicating that the SMS in SGSN is not supported is received along with or in the Attach Accept message, the MS 501 saves the information on whether the CN node 503 supports SMS in SGSN at step 550.

In the case of supporting SMS in SGSN, the CN node 503 sends the MS 501 the Attach Reject message at step 540 because it is not necessary that the MS 501 attach to the CS network. In this case, the CN node 503 is capable of transmitting the information indicating that the SMS in SGSN is supported along with or in the Attach Reject message. Afterward, the MS 501 saves the information on whether the CN node 503 supports SMS in SGSN at step 550.

The MS 501 stores the supportability of SMS in SGSN per PLMN or Location Area for use in interaction with the core network when the PLMN or Location Area is changed afterward.

According to an exemplary embodiment of the present invention, when the PS-attached MS is attempting to attach to the PS domain, the CN node verifies the MS's request based on the MS information provided by HSS/HLR and sends the MS the information configured depending on whether the CN node supports SMS in SGSN such that the MS determines the domain to attach to based on the information.

<Second Exemplary Embodiment>

According to the second exemplary embodiment, the MS selects the domain to attach through the interaction with an RAN node.

Figure 6:
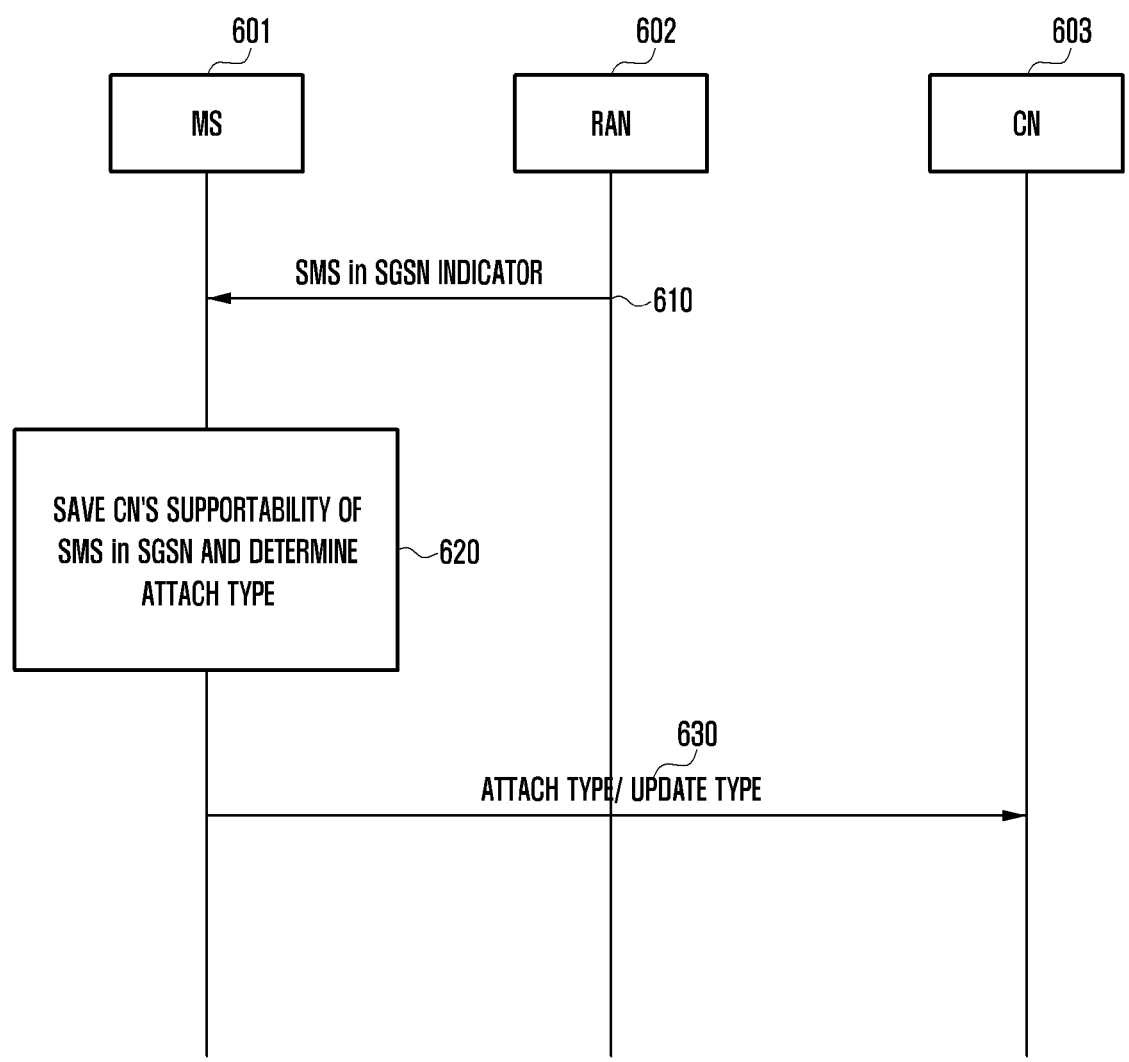
FIG. 6 is a signal flow diagram illustrating a procedure for selecting a domain to attach to based on an indicator of a Radio Access Network (RAN) node in an SMS delivery method according to an exemplary embodiment of the present invention.

FIG. 6 is a signal flow diagram illustrating a procedure for selecting a domain to attach to based on an indicator of a Radio Access Network (RAN) node in an SMS delivery method according to an exemplary embodiment of the present invention.

Referring to FIG. 6, the network includes an MS 601, an RAN node 602, and a CN node 603.

The CN node 603 first determines whether to enable SMS delivery over PS (SMS in SGSN) through interaction with the RAN node 602 (e.g. Universal Terrestrial Radio Access Network (UTRAN), GSM/Edge Radio Access Network (GE-RAN), etc.) (not shown). The RAN node 602 notifies the MS 601 whether the SMS delivery over PS is supported depending on the configuration at step 610. At this time, the RAN node 602 is capable of notifying of the configuration with an indicator. That is, the RAN node 602 sends the MS 601 the indicator set to a value according to whether the SMS delivery over PS is supported, and the MS 601 determines, based on the indicator, whether the SMS delivery over PS is supported.

The MS 601 saves the information on whether the CN node 603 supports the SMS delivery over PS (SMS in SGSN) according to the indicator received from the RAN node 602 and determines the attach type based thereon at step 620. Next, the MS 601 sends the Attach Request message to the CN node 603 at step 630 according to the attach type determined at step 620.

In an exemplary embodiment of the present invention, the MS 601 is capable of determining the domain to attach to according to the indication from the RAN node 602. The MS 601 is capable of acquiring the information on whether the operator network supports the SMS over PS through interaction with the RAN node 602 before the attachment to the CN node 603 and determining the domain to attach to based on the acquired information.

<Third Exemplary Embodiment>

Whether "SMS in SGSN" configuration is applied per PLMN or Location Area (e.g. cell, TA, RA, or LA) can be determined by the network operator. According to the third exemplary embodiment, if the MS changes PLMN or Location Area, the domain to attach to can be determined through interaction between the MS and the CN node.

Figure 7:
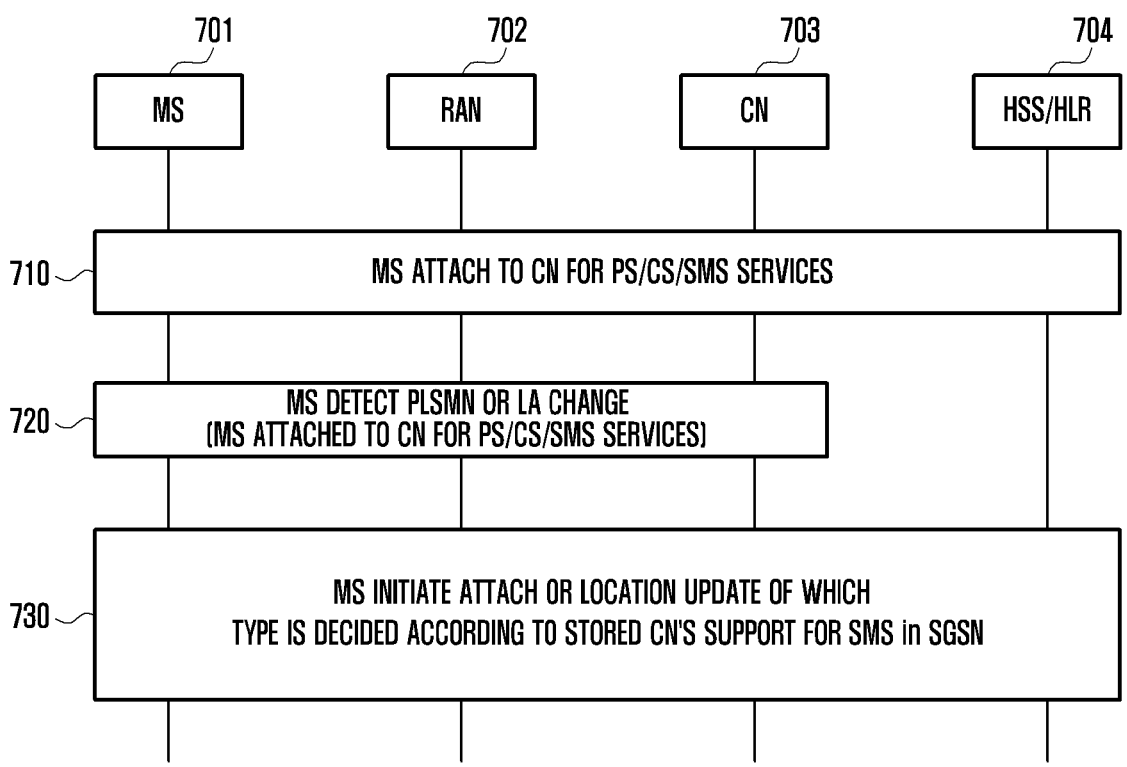
FIG. 7 is a signal flow diagram illustrating a domain selection procedure for an MS changing a Public Land Mobile Network (PLMN) or a Location Area in an SMS delivery method according to an exemplary embodiment of the present invention.

FIG. 7 is a signal flow diagram illustrating a domain selection procedure for an MS changing PLMN or Location Area in an SMS delivery method according to an exemplary embodiment of the present invention.

Referring to FIG. 7, the MS 701, by means of the RAN node 702 and HSS/HLR 704, is in the connected state connected with the CN node 703 for PS, CS, or SMS service at step 710. The MS 701 detects the change of PLMN or Location area at step 720. The MS 701 is capable of initiating an attach or updating its location according to the attach type determined based on previously stored information indicating whether the CN 703 supports SMS in SGSN at step 730.

As described above, an exemplary SMS delivery method of the present invention is capable of delivering an SMS message efficiently in a wireless communication system.

To implement exemplary embodiments described above, the CN and the MS may each comprise a controller. The individual controllers of the CN and the MS can control overall operations including the exemplary embodiments described above.

Further, the controller of the core network node (i.e. SGSN) can provide information indicating whether SMS in SGSN is supported to other core network nodes (i.e., HSS) through the PS domain, in the Attach/RAU procedure. The other CN can notify the configuration of the SMS transmitting path and subscriber information (SMS in SGSN supported).

While the invention has been shown and described with reference to certain exemplary embodiments thereof, it will be understood by those skilled in the art that various changes in form and details may be made without departing from the spirit and scope of the invention as defined by the appended claims and their equivalents.

What is claimed is:

1. A method for offering short message service (SMS) by a core network (CN) node in a mobile communication system, the method comprising:

receiving first information indicating that a mobile station requests SMS among circuit switched (CS) domain services from the mobile station;

transmitting an update location message including second information indicating that the CN node supports SMS to a home subscriber server (HSS);

receiving subscription data including third information indicating whether SMS via the CN node is supported from the HSS;

transmitting, when SMS via the CN node is supported based on the third information, an attach accept message including fourth information indicating that SMS via packet switched (PS) domain is supported to the mobile station; and determining whether to perform a location update based on the third information.

2. The method of claim 1, further comprising:
receiving fifth information indicating whether the mobile station supports PS domain service from the HSS; and
verifying that the mobile station uses PS domain service and the mobile station supports SMS among CS domain services, based on the fifth information and the third information.

3. The method of claim 1, further comprising:
preventing the CN node from performing the location update, when determined that the mobile station request SMS among CS domain services and the mobile station supports SMS among CS domain services.

4. The method of claim 1, wherein the core network node is a serving general packet radio service (GPRS) support node (SGSN).

5. A method for supporting short message service (SMS) by a mobile station in a mobile communication system, the method comprising:
transmitting, to a core network (CN) node, first information indicating that the mobile station requests SMS among circuit switched (CS) domain services;
receiving, when SMS via the CN node is supported based on subscription data received by the CN node from a home subscriber server(HSS), second information indicating that SMS via packet switched (PS) domain is supported from the CN node;
determining whether to perform a location update procedure via CS domain based on the second information;
when SMS via PS domain is not supported based on the second information, performing the location update procedure for CS domain; and
when SMS via PS domain is supported based on the second information, performing the location update procedure for PS domain.

6. The method of claim 5, wherein the receiving further comprises receiving the second information from the CN node if the mobile station only supports SMS among CS domain services and the CN node offers SMS via PS domain.

7. The method of claim 5, further comprising saving third information indicating whether SMS via PS domain is supported in the CN node.

8. The method of claim 5, wherein the determining whether to perform the location update procedure comprises not performing any procedure via the CS domain, if it is determined that the mobile station only requests SMS among circuit switched domain services and SMS via PS domain is offered.

9. The method of claim 5, wherein the core network node is a serving general packet radio service (GPRS) support node (SGSN).

10. A core network (CN) node for offering short message service (SMS) in a mobile communication system, the core network node comprising:
a transceiver configured to receive and transmit a signal; and a controller configured to receive first information indicating that a mobile station requests SMS among circuit switched (CS) domain services from the mobile station;

to transmit an update location message including second information indicating that the CN node supports SMS to home subscriber server (HSS);

to receive subscription data, the subscription data including third information indicating whether SMS via the CN node is supported from the HSS, to transmit, when SMS via the CN is supported based on the third information, fourth information indicating that SMS via packet switched (PS) domain is supported to the mobile station; and to determine whether to perform a location update based on the third information.

11. The core network node of claim 10, wherein the control receives fifth information indicating whether the mobile station supports PS domain service from the HSS, and verifies that the mobile station uses PS domain service and the mobile station supports SMS among CS domain services, based on the fifth information and the third information.

12. The core network node of claim 10, wherein the controller prevents the CN node from performing the location update, when determined that the mobile station request SMS among CS domain services and the mobile station supports SMS among CS domain services.

13. The core network node of claim 10, wherein the core network node is a serving general packet radio service (GPRS) support node (SGSN).

14. A mobile station for supporting short message service (SMS) in a mobile communication system, the mobile station comprising:
a transceiver configured to receive and transmit a signal; and
a controller configured to transmit, to a core network (CN) node, first information indicating that the mobile station requests SMS among circuit switched (CS) domain services;
to receive, when SMS via the CN node is supported based on subscription data received by the CN node from a home subscriber server(HSS), a second information indicating that SMS via packet switched (PS) domain is supported;
to determine whether to perform a location update procedure via CS domain based on the second information;
when SMS via PS domain is not supported based on the second information, to perform the location update procedure for CS domain; and
when SMS via PS domain is supported based on the second information, to perform the location update procedure for PS domain.

15. The mobile station of claim 14, wherein the controller receives the second information from CN node if the mobile station only supports SMS among CS domain services and the CN node offers SMS via PS domain.

16. The mobile station of claim 14, wherein the controller saves third information indicating on whether SMS via PS domain is supported in the CN node.

17. The mobile station of claim 14, wherein the controller does not perform any procedure via the CS domain if it is determined that the mobile station only requests SMS among circuit switched domain services and SMS via PS domain is offered.

18. The mobile station of claim 14, wherein the core network node is a serving general packet radio service (GPRS) support node (SGSN).

* * * * *